(12) United States Patent
Richmond

(10) Patent No.: US 6,834,572 B1
(45) Date of Patent: Dec. 28, 2004

(54) ADJUSTABLE DRIVE CHAIN SAW WOODWORKING MACHINE

(76) Inventor: Paul A. Richmond, 1577 State Route 39 NE., New Philadelphia, OH (US) 44663

( * ) Notice: Subject to any disclaimer, the term of this patent is extended or adjusted under 35 U.S.C. 154(b) by 0 days.

(21) Appl. No.: 09/562,760

(22) Filed: May 2, 2000

(51) Int. Cl.[7] .............................. B26D 1/48; B26D 1/54
(52) U.S. Cl. ............................. 83/820; 83/788; 83/794; 83/801; 83/804; 83/816
(58) Field of Search .................... 83/788, 794, 796, 83/797, 798, 799, 800, 801, 803, 804, 805, 806, 807, 808, 809, 813, 816, 820, 55, 792; 30/380; 125/21

(56) References Cited

U.S. PATENT DOCUMENTS

| | | | | |
|---|---|---|---|---|
| 203,654 A | * | 5/1878 | Seaman | 83/820 X |
| 274,926 A | * | 4/1883 | Folsom | 125/21 |
| 357,681 A | * | 2/1887 | Maxwell | 83/820 X |
| 451,199 A | * | 4/1891 | Kesseler | 83/820 X |
| 817,847 A | * | 4/1906 | Grice | 125/21 |
| 1,011,368 A | * | 12/1911 | Preston | 83/820 X |
| 1,305,053 A | * | 5/1919 | Beugler | 83/820 X |
| 1,867,377 A | * | 7/1932 | Rohwedder | 83/805 |
| 1,895,274 A | * | 1/1933 | Alexander | 83/796 X |
| 2,904,826 A | * | 9/1959 | Hotard | 83/820 X |
| 3,171,313 A | * | 3/1965 | Ohlenroth | 83/808 X |
| 4,056,031 A | * | 11/1977 | Thornton | 83/794 |
| 4,191,159 A | * | 3/1980 | Collins | 83/820 X |
| 5,001,957 A | * | 3/1991 | Steckler | 83/792 |
| 5,509,206 A | * | 4/1996 | Rowe et al. | 30/380 |
| 5,813,307 A | * | 9/1998 | Richmond | 83/820 |

* cited by examiner

*Primary Examiner*—Clark F. Dexter
(74) *Attorney, Agent, or Firm*—Mattingly, Stanger & Malur, P.C.

(57) ABSTRACT

A woodworking machine includes an adjustable table for holding a workpiece thereon and a drive chain saw spaced from the table and having cutting teeth on one edge and drive engaging chain guides adjacent an opposite edge. The drive engaging chain guides engage a drive wheel driven by a motor. A support plate is positioned above the table and has a plurality of slots therein for adjustably mounting a plurality of roller guide elements positioned to engage both sides of the drive chain saw. Each of the roller guide elements includes at least one groove in an outer periphery thereof and the drive chain saw includes circular chain guides which mate with the groove. Threaded pins are provided for adjusting the position of each of the roller guide elements to engage the drive chain saw whereby a portion of the drive chain saw is formed into an undulating shape to cut curved surfaces in the workpiece when the drive chain saw and the workpiece come into contact. The device further may include a plurality of profile cutting bits mounted on the drive chain saw at a position spaced inwardly from the cutting teeth. The cutting teeth are separated by guide pieces.

17 Claims, 3 Drawing Sheets

ADJUSTABLE DRIVE CHAIN SAW WOODWORKING MACHINE

BACKGROUND OF THE INVENTION

1. Field of the Invention

The present invention relates to an adjustable drive chain saw woodworking machine designed to cut out shaped pieces of wood such as those used for legs and other parts of tables and other furniture. The wood part to be cut is characterized by having undulations in the form of indentations and protrusions so that the drive chain saw must bend to form these curved parts.

2. Description of the Related Art

In large scale production of shaped pieces of wood such as legs for tables and other furniture, there is a need to cut out the legs from hardwood, such as oak, in order to form the legs in large quantities while still providing satisfactory safety so that injuries to a worker may be minimal if not nonexistent.

In the production of large quantities of shaped pieces of wood, such as legs for furniture, there is a need to cut the legs so that they have the necessary curves, that is, indentations and protrusions to meet a desired design shape. At the same time, production must be done in a way that all OSHA requirements are met and the workers' safety is maximized. Accordingly, there is a need for a machine to make the first cut of the legs which may be from oak boards 1 inch or 2 inches thick. The oak boards are sometimes glued to form 4 inches or more of stock which must be cut with various curved indentations and sometimes protrusions. This should be done with as few machine operations on the cutting machine as possible.

SUMMARY OF THE INVENTION

It is an object of the present invention to provide a woodworking machine having a drive chain saw and a plurality of adjustable roller guide elements to engage the drive chain saw whereby at least a portion of the drive chain saw is formed into an undulating shape to cut curved surfaces in a workpiece when the drive chain saw and the workpiece come into contact.

A further object of the invention is to provide a woodworking machine having a drive chain saw capable of cutting curved surfaces in a workpiece while still providing an operator with satisfactory protection against injuries.

The present invention achieves the above and other objects by providing a woodworking machine which includes an adjustable table for holding a workpiece thereon and a drive chain saw spaced from the table and having a cutting means on one edge and drive engaging means adjacent an opposite edge. The drive engaging means engage a drive wheel driven by suitable power means such as a motor. A support plate is positioned above the table and has a plurality of slots therein for adjustably mounting a plurality of roller guide elements positioned to engage both sides of the drive chain saw. Each of the roller guide elements includes at least one groove in an outer periphery thereof and the drive chain saw includes at least one circular chain guide which mates with the groove. Means are provided for adjusting the position of each of the roller guide elements to engage the drive chain saw whereby a portion of the drive chain saw is formed into an undulating shape to cut curved surfaces in the workpiece when the drive chain saw and the workpiece come into contact. The device further may include a plurality of profile cutting bits mounted on the drive chain saw at a position spaced inwardly from the cutting means. The cutting means preferably comprise a plurality of cutting teeth separated by guide pieces.

These and other features and advantages of the present invention will become more apparent with reference to the following detailed description and drawings.

DETAILED DESCRIPTION OF THE PREFERRED EMBODIMENTS

Figure 3:
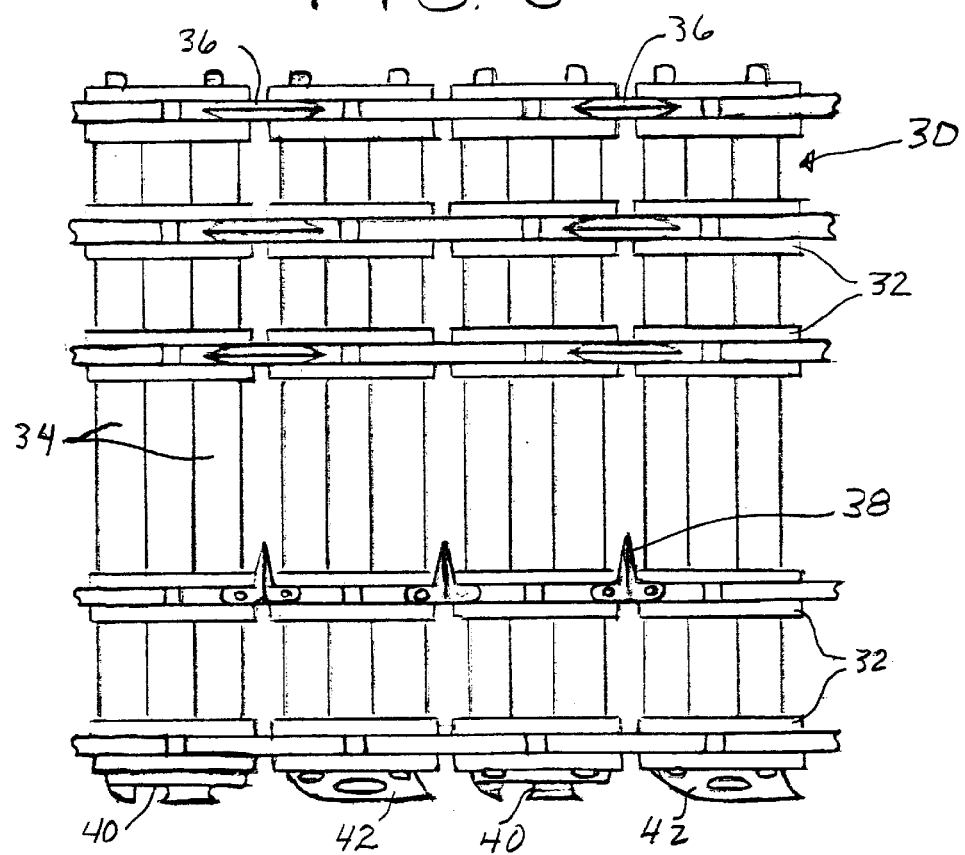
FIG. 3 is an enlarged top view of a portion of the drive chain saw of the present invention.
Figure 4:
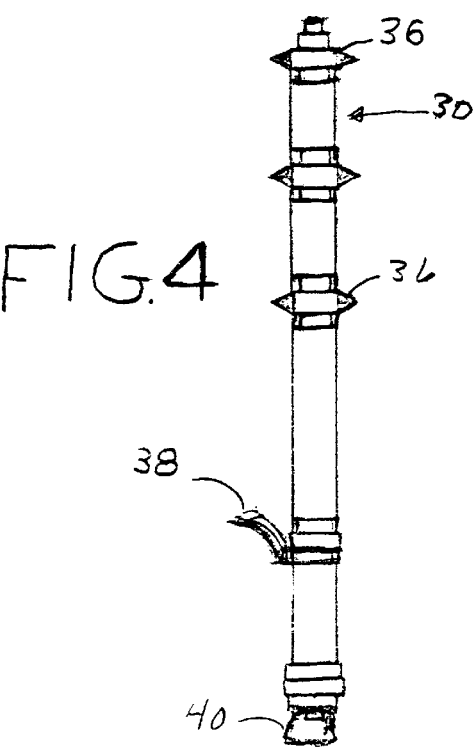
FIG. 4 is an enlarged end view of a portion of the drive chain saw of FIG. 3.
Figure 5:
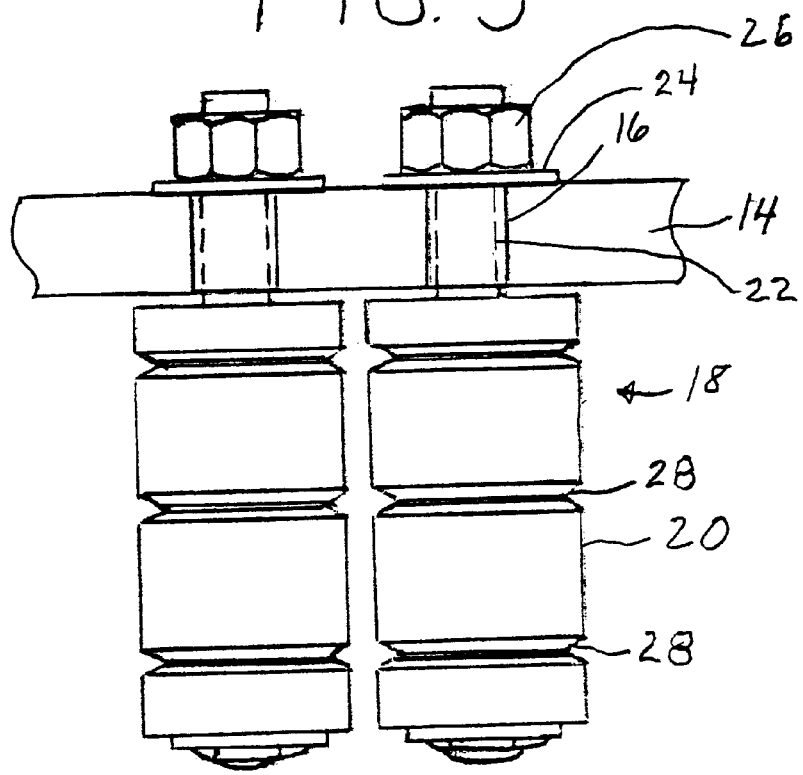
FIG. 5 is an enlarged front view of two adjustable guide bearings mounted in slots of a horizontal support member according to the invention.

Referring to FIGS. 1–6 of the drawings, a woodworking machine, generally referred to by the numeral 10, is shown. The woodworking machine includes a supporting framework, generally referred to by the numeral 12. The supporting framework further includes a horizontal support plate member 14 having a plurality of elongated slots 16 formed therein to receive a plurality of roller guide elements or bearings 18. As shown in FIG. 5, each of the roller guide elements or bearings 18 includes a roller element 20 rotatably mounted on a pin 22 which extends through the slot 16. Each pin is threaded at the top portion thereof to receive a washer 24 and a nut 26 to tighten the roller guide element in a desired position in a slot. To adjust the position of the roller guide element, it is only necessary to loosen the nut 26 and move the element 18 from the slot to a desired position and then tighten the nut to maintain the roller guide element in the desired position. Each roller 20 is provided on the periphery thereof with a plurality of grooves 28. In a preferred embodiment, at least three grooves 28 are provided on each roller 20.

The woodworking machine further includes a flexible drive chain saw 30 having cutting means on one edge and drive engaging means adjacent an opposite edge.

As shown in FIGS. 3 and 4, the drive chain saw 30 is comprised of a plurality of rows of connected links 32 which support a plurality of spaced slats 34 to form a chain structure. As best shown in FIG. 3, at least five rows of links are provided.

The top three rows of links have a plurality of spaced circular chain guides 36 which fit into corresponding grooves 28 on each of the roller guide elements or bearings 18. The fourth row of links contains a plurality of profile cutting bits 38 which operate to round off a corner of a workpiece.

The fifth row of links of the drive chain saw 30 is at the bottom edge of the drive chain saw and has a plurality of cutting teeth 40 separated by guide pieces 42. The cutting teeth 40 are slightly wider than the bottom of the drive chain whereby as the workpiece is cut, the bottom portion of the drive chain extends through the cut made by the teeth.

Figure 1:
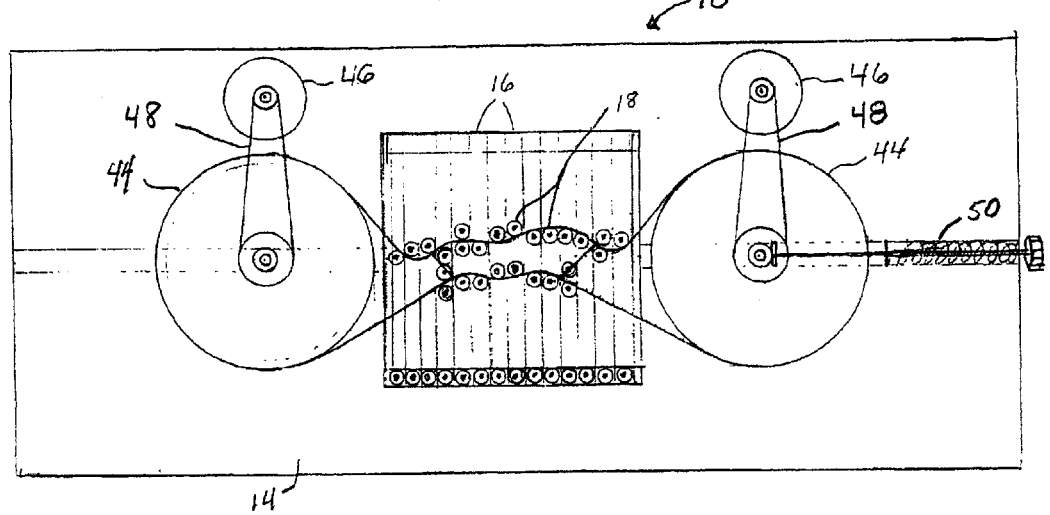
FIG. 1 is a top plan view of an adjustable drive chain saw woodworking machine according to the present invention showing a drive chain saw and adjustable guide bearings that control the path of the drive chain saw.
Figure 2:
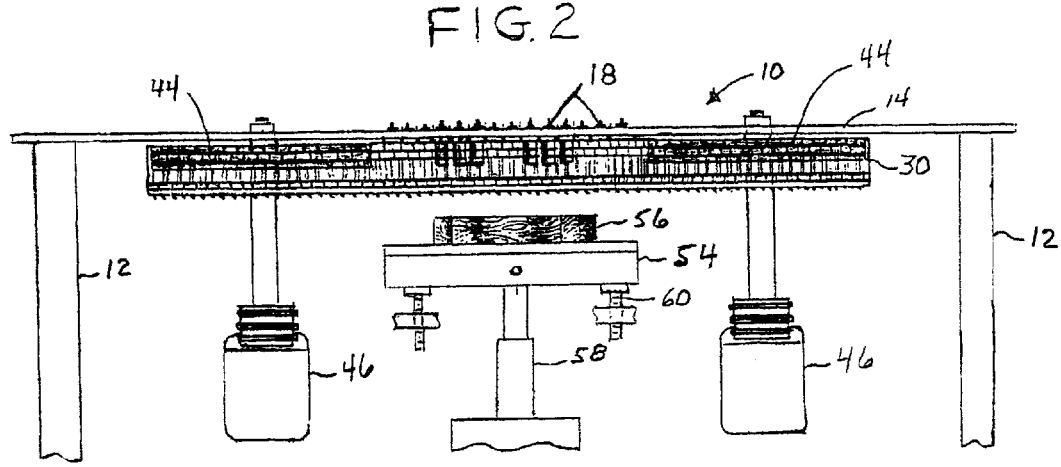
FIG. 2 is a front elevational view of the drive chain saw woodworking machine of FIG. 1.

As best shown in FIGS. 1 and 2, the drive chain saw is driven by drive wheels 44 at each end thereof. The drive wheels in turn are rotated by suitable motor means, such as electric motors 46 connected to the drive wheels by drive belts 48.

Screw type tension means 50 are provided for adjusting the position of at least one drive wheel 44 to adjust the tension of the drive chain saw. While in FIG. 1 only one screw tension means is shown, an additional screw type tension means also may be applied to the drive wheel shown on the left side of FIG. 1.

Figure 6:
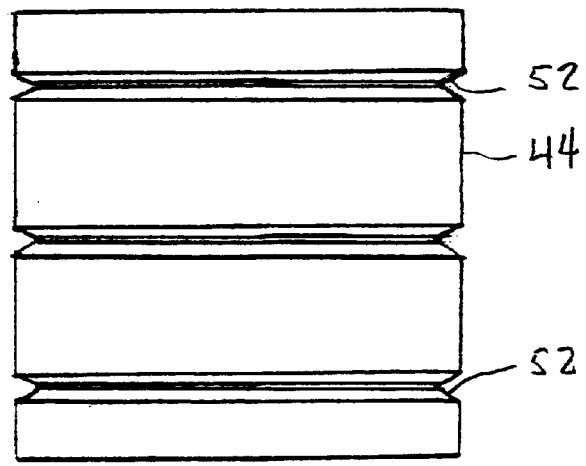
FIG. 6 is an enlarged front elevational view of a drive wheel for the drive chain saw of the present invention.

As shown by the enlarged view of one of the drive wheels 44 in FIG. 6, each drive wheel is provided with at least three grooves 52 in an outer periphery thereof which mate with the circular chain guides 36 in the first three rows of links of the drive chain saw to ensure adequate rotation of the drive chain saw.

As shown in FIG. 2, a table 54 is provided for holding a workpiece 56 in position to be cut under the drive chain saw 30. The table 54 may be moved upwardly and downwardly by means of a suitable hydraulic cylinder 58. Adjustable screws 60 also may be provided for varying the angle of the table 54 and the workpiece held thereon.

In operation of the woodworking machine of the present invention, a workpiece 56 is securely mounted to table 54. The drive chain saw 30 is then rotated by the motors 46 and the workpiece is then brought into contact with the drive chain saw by raising the elevation of the platform 54 with the hydraulic cylinder 58. It therefore is not necessary for a worker to be close to the drive chain saw at the time the workpiece is cut.

Prior to cutting the workpiece, the roller guide elements or bearings 18 are securely positioned in the slots 16 to form the drive chain saw into the particular curved configuration in which it is desired to cut the workpiece. After the workpiece has been moved upwardly and cut into the desired configuration, the hydraulic cylinder 58 is then operated to lower or withdraw the work table 54 away from the drive chain saw and the cut workpiece is then removed from the table and a new uncut workpiece is put on the table and the whole operation is repeated.

Numerous other modifications and adaptations of the present invention will be apparent to those skilled in the art and thus, it is intended by the following claims, to cover all such modifications and adaptations which fall within the true spirit and scope of the invention.

What is claimed is:

1. A woodworking machine comprising:
a table for holding a workpiece thereon;
a drive chain saw spaced from said table and having a cutting means on one edge and drive engaging chain guides adjacent an opposite edge;
power means for driving said drive chain saw in a path;
a support plate member positioned above said table and having a plurality of slots therein;
a plurality of roller guide elements adjustably mounted in said slots and engaging both sides of said drive chain saw; and
means for adjusting the position of each of said roller guide elements in one of said slots to engage said drive chain saw whereby at least a portion of said drive chain saw is formed into an undulating shape to cut curved surfaces in the workpiece when said drive chain saw and the work piece come into contact.

2. A woodworking machine according to claim 1, which further includes a plurality of profile cutting bits mounted on said drive chain saw at a position spaced inwardly from said cutting means.

3. A woodworking machine according to claim 1, wherein said cutting means comprises a plurality of cutting teeth separated by guide pieces.

4. A woodworking machine according to claim 1, wherein said roller guide elements each include at least one groove in an outer periphery thereof and said chain guides of said drive chain saw mate with said groove.

5. A woodworking machine according to claim 1, wherein said drive chain saw includes a plurality of rows of connected links.

6. A woodworking machine according to claim 5, wherein said cutting means comprises a plurality of cutting teeth and said cutting teeth are wider than said links.

7. A woodworking machine according to claim 1, wherein said means for adjusting the position of each of said roller guide elements in one of said slots comprises a pin extending through said roller guide element and said one slot, said pin having threads at an outer end thereof, and a nut threadably engaged with said outer end of said pin.

8. A woodworking machine according to claim 1, which includes means for bringing said workpiece and said drive chain saw into contact with each other.

9. A woodworking machine according to claim 1, wherein said power means includes a drive wheel having at least one groove in an outer periphery thereof and said chain guides of said drive chain saw mate with said groove.

10. A woodworking machine according to claim 9, which further includes tension control means operatively connected to said drive wheel for adjusting the tension of said drive chain saw.

11. A woodworking machine comprising:
a table for holding a workpiece thereon;
a drive chain saw spaced from said table and having a cutting means on one edge and drive engaging chain guides adjacent an opposite edge;
power means for driving said drive chain saw in a path;
a support plate member positioned above said table and having a plurality of slots therein;
a plurality of roller guide elements adjustably mounted in said slots and engaging both sides of said drive chain saw;

each of said roller guide elements including at least one groove in an outer periphery thereof and said chain guides of said drive chain saw mate with said groove;

means for adjusting the position of each of said roller guide elements in one of said slots to engage said drive chain saw whereby at least a portion of said drive chain saw is formed into an undulating shape to cut curved surfaces in the workpiece when said drive chain saw and the work piece come into contact; and said cutting means comprising a plurality of cutting teeth separated by guide pieces.

12. A woodworking machine according to claim 11, wherein said drive chain saw includes a plurality of rows of connected links.

13. A woodworking machine according to claim 11, wherein said cutting means comprises a plurality of cutting teeth and said cutting teeth are wider than said links.

14. A woodworking machine according to claim 11, wherein said means for adjusting the position of each of said roller guide elements in one of said slots comprises a pin extending through said roller guide element and said one slot, said pin having threads at an outer end thereof, and a nut threadably engaged with said outer end of said pin.

15. A woodworking machine according to claim 11, which further includes a plurality of profile cutting bits mounted on said drive chain saw at a position spaced inwardly from said cutting means.

16. A woodworking machine according to claim 11, wherein said power means includes a drive wheel having at least one groove in an outer periphery thereof and said chain guides of said drive chain saw mate with said groove.

17. A woodworking machine according to claim 16, which further includes tension control means operatively connected to said drive wheel for adjusting the tension of said drive chain saw.

* * * * *